United States Patent [19]

Persson

[11] Patent Number: 5,665,933
[45] Date of Patent: Sep. 9, 1997

[54] DEVICE FOR CLADDING TUBES BY MEANS OF AN EXPLOSIVE PROCESS

[75] Inventor: Ingemar Persson, Gyttorp, Sweden

[73] Assignee: B Omentum Leasing AB, Saltsjobaden, Sweden

[21] Appl. No.: 302,686

[22] PCT Filed: Mar. 10, 1993

[86] PCT No.: PCT/SE93/00209

§ 371 Date: Dec. 22, 1994

§ 102(e) Date: Dec. 22, 1994

[87] PCT Pub. No.: WO93/17825

PCT Pub. Date: Sep. 16, 1993

[30] Foreign Application Priority Data

Mar. 11, 1992 [SE] Sweden ................... 9200751

[51] Int. Cl.$^6$ .................. F42D 3/00; B21C 1/00
[52] U.S. Cl. .............. 102/333; 102/312; 102/313; 72/706
[58] Field of Search ................ 102/312, 313, 102/333; 72/706

[56] References Cited

U.S. PATENT DOCUMENTS

| 3,718,088 | 2/1973 | Bearden et al. | 102/71 |
| 4,587,904 | 5/1986 | Berman et al. | 102/333 |
| 4,672,832 | 6/1987 | Merker | 72/62 |
| 4,685,205 | 8/1987 | Schroeder et al. | 29/727 |
| 4,860,656 | 8/1989 | Hardwick | 102/312 |
| 4,879,890 | 11/1989 | Hardwick | 72/62 |
| 5,003,880 | 4/1991 | Gut et al. | 102/314 |

*Primary Examiner*—Peter A. Nelson
*Attorney, Agent, or Firm*—Nies, Kurz, Bergert & Tamburro

[57] ABSTRACT

A device for internally cladding an outer tube with an inner tube by means of an explosion process. The device includes an outer tubular fixture (1) in which a workpiece in the form of the outer (2) and the inner (3) tubes can be placed; at least one end of the tubular fixture (1) is connected to an expansion chamber (7, 10); and a sealing cap (6) of easily destructed material is located between a respective expansion chamber (7, 10) and the workpiece. The sealing cap or caps (6) is/are intended to retain a liquid pressure-transmitting medium (5), preferably water, in the inner tube (3) prior to detonating an explosive substance (4) placed within the inner tube (3).

5 Claims, 1 Drawing Sheet

U.S. Patent         Sep. 9, 1997         5,665,933
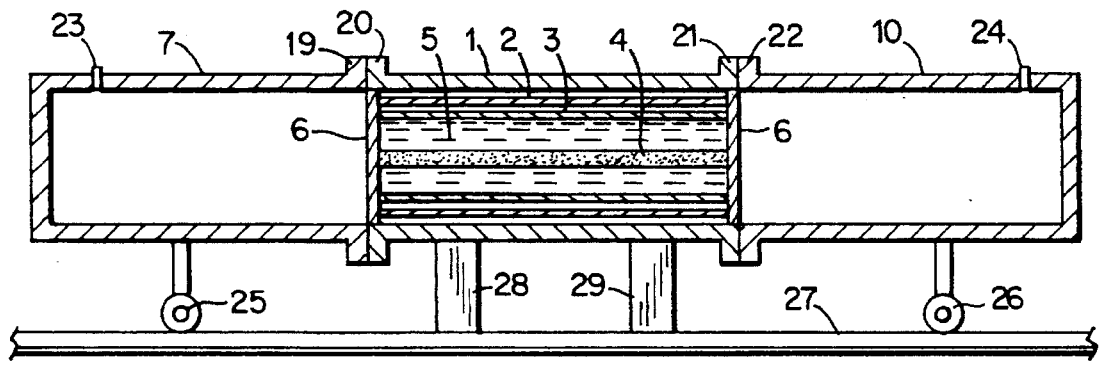
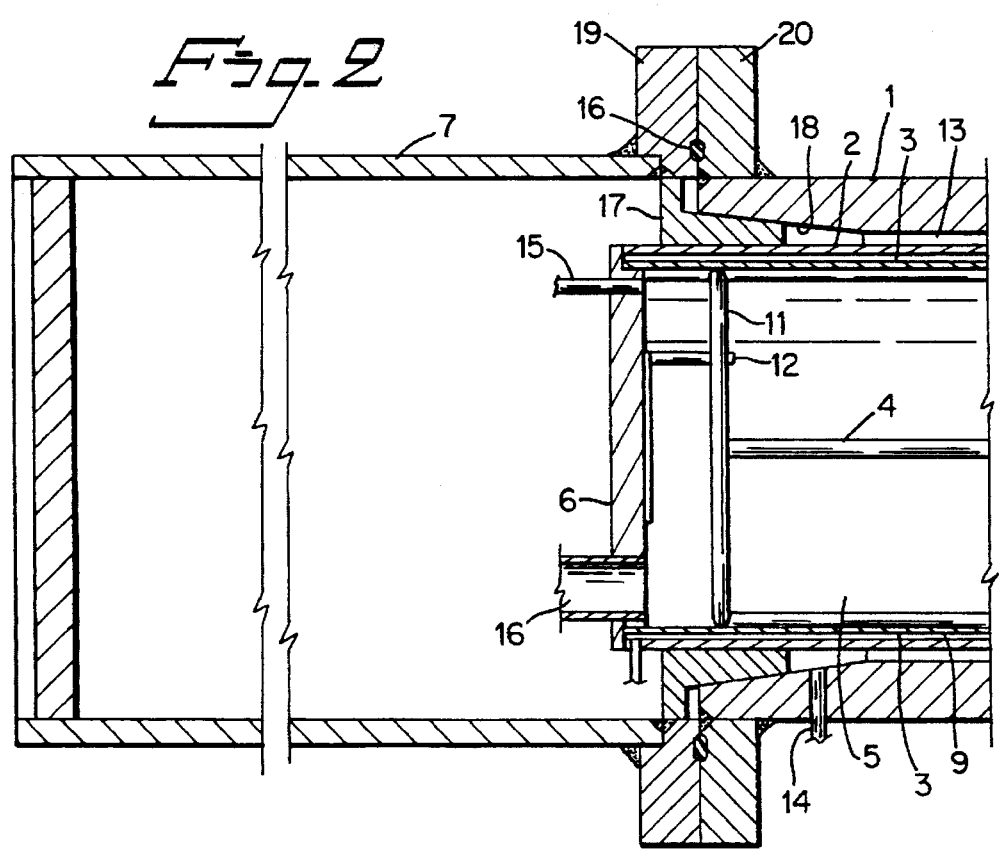
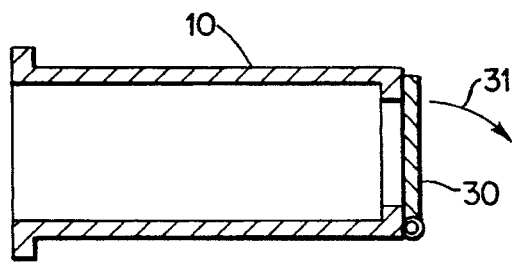

DEVICE FOR CLADDING TUBES BY MEANS OF AN EXPLOSIVE PROCESS

BACKGROUND OF THE INVENTION

1. Field of the Invention

The present invention relates to a device for cladding an outer tube With an inner tube made, for instance, corrosion-resistant material, in which the inner tube is bonded to the outer tube by means of an explosion process.

2. Description of the Related Art

It is known to clad tubes, for instance steel tubes, for transporting oil and gas or other chemical products, with a thin internal tube made of corrosion-resistant material, by means of an explosion process.

Hitherto, it has been necessary to carry out such tube cladding processes in separate firing places, mostly outdoors, due to noise and gases. This results in relatively high transportation and handling costs. Moreover, cladding processes are dependent on weather and wind conditions.

The present invention relates to a device which enables tubes to be clad by explosion processes in a practically noiseless fashion and in a workshop locality.

SUMMARY OF THE INENTION

The present invention thus relates to a device for cladding an outer tube with an inner tube by means of an explosion process, and is characterized in that the device includes an outer tubular fixture in which a workpiece comprising said outer and said inner tube is intended to be placed; in that at least one end of the tubular fixture is connected to an expansion chamber; in that a sealing cap of easily destroyed material is located between the expansion chamber and the workpiece, said sealing cap or caps being intended to retain a liquid pressure transmitter, preferably water, in the inner tube prior to detonation of an explosive substance placed within the inner tube.

BRIEF DESCRIPTION OF THE DRAWINGS

The invention will now be described in more detail with reference to exemplifying embodiments thereof shown in the accompanying drawings, in which FIG. 1 is a schematic axial sectional view of the inventive device;

FIG. 2 illustrates one end of the device in larger scale; and

FIG. 3 illustrates one end of an alternative embodiment of the device.

DESCRIPTION OF THE PREFERRED EMBODIMENTS

FIG. 1 illustrates schematically a device constructed in accordance with the invention. The device includes an outer tubular fixture 1 in which a workpiece 2, 3 comprising an outer tube 2 and an inner tube 3 is inserted. The workpiece also includes one or more explosive charges 4, placed within the inner tube 3. At least one end of the tubular fixture is connected to an expansion chamber 7, 10. The device also includes sealing caps 6 which are made of an easily destroyed material and which are intended to be fitted onto both ends of the workpiece and function to retain a liquid pressure-transmitting medium 5, preferably water, in the inner tube.

The caps 6 may be made of plastic, wood-fibre material or gypsum.

When detonating the explosive substance 4 located within the inner tube, the pressure transmitting medium will transmit a shockwave which causes the inner tube 3 to expand towards the inner surface of the outer tube, said inner tube initially having a slightly smaller outer diameter than the inner diameter of the outer tube 2. Simultaneously the caps 6 will burst. The gas generated and the pressure transmitting medium therewith flow into the expansion chambers 7, 10.

About one cubic meter of gas at normal pressure per kilogram of explosive substance is generated by the detonation. If the tubular fixture were closed at its ends, the pressure generated by the detonation would be extremely high, since the pressure-transmitting medium is incompressible. Because the inventive device includes expansion chambers and destructible caps, the pressure generated as the gases flow out into the expansion chambers will not be particularly high. Naturally, the pressure that prevails after the detonation will depend on the volume of the expansion chambers in relation to the amount of explosive used. Accordingly, the volume of the expansion chambers is conveniently chosen so that the pressure in the expansion vessels will be relatively low after the detonation.

A valve 23, 24 may be provided in the wall of each chamber for evacuating the expansion chambers after detonation.

It is also conceivable to lower the pressure in the expansion chambers prior to detonation by evacuating air through the valves 23, 24.

Because the explosion takes place in a closed chamber consisting of the tubular fixture and the expansion chambers, no gas pressure wave will be generated outside the closed chamber. This means that the level of noise generated will be very low in comparison with the noise generated when using known techniques. As before mentioned, the explosion bonding process can be effected indoors in a workshop locality. The present invention therefore enables an explosion bonding process to be effected more cheaply and more favourably than known techniques.

A method described in Swedish Patent Specification No. ... (Swedish Patent Application No. 9200534-7) can be used advantageously with the present invention. That document describes a method of cladding an outer tube with an inner tube, where the inner tube is made of a corrosion-resistant material, for instance. According to said document, a number of strings of explosive substance are placed at the inner surface of the inner tube, these strings being mutually spaced and extending from one end of the tube to the other. The inner tube is filled with liquid, preferably water, which functions as a pressure-transmitting medium, whereafter all explosive charges are detonated simultaneously.

This results in a local metallurgical join or bond between the inner and the outer tube adjacent the explosive charges. The detonation results in shockwaves which propagate in the pressure-transmitting liquid. The shockwaves interfere with one another and generate high pressures within the inner tube 3, which therewith expands outwardly into abutment with the outer tube 2. This results in a mechanical joint corresponding to a press joint between the inner and the outer tube over those regions where a metallurgical bond is not obtained.

FIG. 2 illustrates in larger scale the left part of the device illustrated in FIG. 1. The reference numeral 4 identifies a string of explosive substance which lies along the wall of the inner tube. The reference numeral 11 identifies a ring of explosive substance which extends along the wall of the inner tube. The reference numeral 12 identifies a detonator which lies against the ring of explosive and is secured in the cap 6.

Instead of using strings of explosive which extend along the wall of the inner tube, an explosive charge may instead be placed axially and centrally in the inner tube. In this case, however, no metallurgical bond will be obtained, unless the charge is very powerful.

Furthermore, when using strings of explosive placed along the wall of the inner tube, a further axially and centrally placed explosive charge can be used to enhance expansion of the inner tube.

As will be seen from FIG. 2, there is found initially a gap 9 between the inner tube 3 and the outer tube 2. The outer tube 2 is centered in relation to the tubular fixture 1 by means of a conical sleeve 17 which coacts with a conical bevel 18 in the inner wall of the tubular fixture 1.

According to one preferred embodiment of the invention, the tubular fixture 1 has an inner diameter which exceeds the outer diameter 2 of the outer tube. The space 13 between the tubular fixture and the outer tube is sealed against the surroundings. The tubular fixture 1 includes a throughlet 14 through which liquid, preferably water, can be introduced into the space 13. By filling the space 13 with water or some other incompressible liquid, the workpiece can be easily inserted into the tubular fixture 1 and removed therefrom after detonation.

FIG. 2 also illustrates throughlets 15, 16 for introducing pressure-transmitting medium to the inner tube 3.

Preferably, each end of the tubular fixture 1 is connected to an individual expansion chamber, although the tubular fixture may be connected to an expansion chamber only at one end thereof. In this latter case, however, the workpiece is also preferably provided with a sealing cap at each end of the outer tube. However, that end of the outer tube which lies against the closed end of the tubular fixture may be sealed against said end.

FIGS. 1 and 2 show a flange connection between the tubular fixture and respective expansion chambers. The flanges can be fastened to one another with bolts or by means of U-shaped clamps which project radially in over the flanges 19, 20; 21, 22. The flanges are sealed against one another by means of a seal 16.

The tubular fixture 1 can be given a significant length, for instance a length of 10 to 15 metres.

According to one preferred embodiment, the expansion chambers are movable in relation to the tubular fixture, so as to provide easy access to the interior of the tubular fixture and to the interior of the expansion chambers. This can be achieved by mounting the expansion chambers 7, 10 on wheels 25, 26 which run on a rail 27 or some other supportive surface. The tubular fixture 1, on the other hand, is preferably fixed to the supporting surface with the aid of braces or stays 28, 29. Preferably, the expansion chambers 7, 10 are also pivotally mounted in addition to being axially movable in relation to the tubular fixture, so as to facilitate insertion and removal of the workpieces and also to facilitate cleaning of the tubular fixture and the expansion chambers.

According to one alternative embodiment, the expansion chamber or chambers is/are fixedly mounted to the tubular fixture and provided with a flap 30 at the end wall thereof, for insertion and removal of the work-piece. FIG. 3 illustrates the right-hand expansion chamber 10 of this embodiment. As indicated by the arrow 31, the flap is hinged. Although not shown, the flap is, of course, provided with locking means which holds the flap closed during the process of detonation.

It will be evident from the foregoing that the present invention solves the problems associated with the known technique mentioned in the introduction.

It is assumed in the aforegoing that the tubes concerned are straight tubes. However, the tubular fixture 1 may be curved so as to enable curved tubes having the same or essentially the same radius of curvature as the tubular fixture to be produced.

Since the aforesaid space 13 contains liquid, the tubular fixture 1 may have a much larger diameter than the outer tube 2. This enables the shape of the tubular fixture 1 to deviate from the shape of the outer tube 2. The cross-sectional shape of the tubular fixture 1 may also deviate from a circular shape. For instance, the tubular fixture may have a square or rectangular cross-sectional shape.

Although the invention has been described with reference to different embodiments thereof, it will be understood that the inventive device may be modified in many ways with regard to its structural configuration.

The present invention shall not therefore be considered restricted to the aforedescribed and illustrated embodiments, since modifications can be made within the scope of the following Claims.

What is claimed is:

1. A device for internally cladding an outer tube with an inner tube by means of an explosion process, said device comprising: an outer tubular fixture in which a workpiece in the form of the outer tube and the inner tube is inserted; a closed expansion chamber connected with at least one end of the tubular fixture; a first sealing cap of easily destroyed material is located between the expansion chamber and the workpiece and a second sealing cap is located at an opposite end of the tubular fixture, said sealing caps provided to retain a liquid pressure-transmitting medium in the inner tube prior to detonating an explosive substance within the inner tube (3).

2. A device according to claim 1, wherein a second closed expansion chamber is connected with the opposite end of the tubular fixture, and the second sealing cap is located between the second expansion chamber and the workpiece and in made from easily destroyed material.

3. A device according to claim 1, wherein the expansion chamber connected with the tubular fixture and is displaceable relative thereto, to provide easy access to the interior of the tubular fixture and to the interior of the expansion chamber.

4. A device according to claim 1, wherein the expansion chamber is fixedly mounted to an end of the tubular fixture and includes a movable flap at an end spaced from the tubular fixture to permit insertion and removal of the workpiece through the expansion chamber.

5. A device according to claim 1, wherein the tubular fixture has an inner diameter which is larger than the outer diameter of the outer tube to define a space therebetween; wherein the space between the tubular fixture and the outer tube is sealed; and wherein the device includes a throughlet through the tubular fixture through which a liquid is introduced into said space.

* * * * *

UNITED STATES PATENT AND TRADEMARK OFFICE
CERTIFICATE OF CORRECTION

PATENT NO. : 5,665,933
DATED : September 9, 1997
INVENTOR(S) : Ingemar Persson

It is certified that error appears in the above-indentified patent and that said Letters Patent is hereby corrected as shown below:

Claim 3, line 2, after "chamber" insert --is removably--.

Signed and Sealed this

Sixteenth Day of December, 1997

Attest:

BRUCE LEHMAN

Attesting Officer

Commissioner of Patents and Trademarks